United States Patent
Hata (10) Patent No.: US 9,331,355 B2
(45) Date of Patent: May 3, 2016

(54) ELECTROLYTE SHEET INCLUDING A PERIPHERAL REGION HAVING A SURFACE ROUGHNESS DIFFERENT FROM A SURFACE ROUGHNESS IN A REGION OTHER THAN THE PERIPHERAL REGION, METHOD OF PRODUCING THE SAME, AND SOLID OXIDE FUEL CELL INCLUDING THE SAME

(75) Inventor: Kazuo Hata, Suita (JP)

(73) Assignee: NIPPON SHOKUBAI CO., LTD., Osaka-Shi (JP)

( * ) Notice: Subject to any disclaimer, the term of this patent is extended or adjusted under 35 U.S.C. 154(b) by 243 days.

(21) Appl. No.: 13/638,225

(22) PCT Filed: Mar. 29, 2011

(86) PCT No.: PCT/JP2011/001882
§ 371 (c)(1),
(2), (4) Date: Sep. 28, 2012

(87) PCT Pub. No.: WO2011/122010
PCT Pub. Date: Oct. 6, 2011

(65) Prior Publication Data
US 2013/0034796 A1 Feb. 7, 2013

(30) Foreign Application Priority Data
Mar. 30, 2010 (JP) ................. 2010-076530

(51) Int. Cl.
*H01M 8/00* (2006.01)
*H01M 8/12* (2006.01)
*H01M 8/24* (2006.01)

(52) U.S. Cl.
CPC ............ *H01M 8/1246* (2013.01); *H01M 8/126* (2013.01); *H01M 8/1253* (2013.01);
(Continued)

(58) Field of Classification Search
CPC .. H01M 8/1246; H01M 8/1253; H01M 8/126
USPC .......................................... 429/496, 452, 535
See application file for complete search history.

(56) References Cited

U.S. PATENT DOCUMENTS 7,781,045 B2   8/2010 Hata et al.
2005/0074650 A1*  4/2005 Sridhar et al. .................. 429/30
(Continued)

FOREIGN PATENT DOCUMENTS

CN   1646449 A   7/2005
EP   1383195 A2   1/2004
(Continued)

OTHER PUBLICATIONS

Yoshikata et al., Machine translation of JP 2005-149815 A, Jun. 2005.*

*Primary Examiner* — Sean P Cullen
(74) *Attorney, Agent, or Firm* — Masuvalley and Partners (57) ABSTRACT

The electrolyte sheet for solid oxide fuel cell of the present invention has different surface roughnesses between the peripheral region and the region other than the peripheral region at least on one side. The surface roughness Ra(b) in the peripheral region is at least 0.05 μm and less than 0.3 μm. The surface roughness Ra(i) in the region other than the peripheral region is at least 0.2 μm and at most 1.2 μm. And, the ratio of Ra(i) to Ra(b) (Ra(i)/Ra(b)) is more than 1 and at most 4. Here, the surface roughness Ra(b) and the surface roughness Ra(i) are arithmetic mean roughness values and determined by an optical and laser-based non-contact three-dimensional profile measuring device in accordance with a German standard 'DIN-4768'.

15 Claims, 2 Drawing Sheets (52) U.S. Cl.
CPC .............. *H01M2300/0074* (2013.01); *H01M 2300/0077* (2013.01); *Y02E 60/521* (2013.01); *Y02E 60/525* (2013.01); *Y02P 70/56* (2015.11)

(56) References Cited

U.S. PATENT DOCUMENTS

| | | | | |
|---|---|---|---|---|
| 2005/0271919 | A1* | 12/2005 | Hata et al. ................. | 429/30 |
| 2008/0206619 | A1* | 8/2008 | Imura et al. ............... | 429/30 |
| 2012/0021304 | A1* | 1/2012 | Satake et al. .............. | 429/408 |

FOREIGN PATENT DOCUMENTS

| | | |
|---|---|---|
| JP | 2000-281438 A | 10/2000 |
| JP | 2005-149815 A | 6/2005 |
| JP | 2007-323899 A | 12/2007 |
| JP | 2009-241593 A | 10/2009 |
| WO | 03/071618 A2 | 8/2003 |
| WO | 2004/034492 A1 | 4/2004 |
| WO | WO 2010110395 A1 * | 9/2010 |

* cited by examiner

ELECTROLYTE SHEET INCLUDING A PERIPHERAL REGION HAVING A SURFACE ROUGHNESS DIFFERENT FROM A SURFACE ROUGHNESS IN A REGION OTHER THAN THE PERIPHERAL REGION, METHOD OF PRODUCING THE SAME, AND SOLID OXIDE FUEL CELL INCLUDING THE SAME

This application is a national phase application under 35 U.S.C. §371 of International Application Serial No. PCT/JP2011/001882, filed on Mar. 29, 2011, and claims the priority under 35 U.S.C. §119 to Japan Patent Application No. 2010-076530, filed on Mar. 30, 2010, which are hereby incorporated by reference.

TECHNICAL FIELD

The present invention relates to an electrolyte sheet for solid oxide fuel cell (hereinafter referred as 'SOFC') and a method of producing the electrolyte sheet as well as a single cell for SOFC and an SOFC using the electrolyte sheet. The present invention is particularly related to an oxygen ion-conductive solid electrolyte sheet having a superior sealability and its production method as well as an electrolyte-supported cell (hereinafter referred as 'ESC') using the electrolyte sheet.

BACKGROUND OF THE INVENTION

Ceramics have been utilized in many fields because of not only their outstanding mechanical properties such as heat resistance and abrasion resistance but also their excellent electric and magnetic properties. Among these, zirconia-based ceramic sheets have a superior oxygen ion conductivity and high toughness in addition to these properties. Thus, they are utilized as solid electrolytes for sensors, such as oxygen sensor and humidity sensor, and further as a solid electrolyte for SOFC.

In the electrolyte sheet for SOFC, in addition to enhancing the membrane strength, it is desired to increase the contact area between the electrolyte sheet and an anode and a cathode provided on the surfaces of the electrolyte sheet to enhance the effective area of electrochemical reaction and power generation performance. Also, in the electrolyte sheet for SOFC, in order to achieve a stable power generation performance, it is desired to prevent the anode and cathode from delaminating from the electrolyte sheet during the operation of the fuel cell or while the temperature is increased or decreased. To achieve such objectives, the inventor focused on the surface roughness of the electrolyte sheet and investigated a wide range of surface roughness. Through this work, the inventor found Patent Documents 1-3 which infer that an electrolyte sheet having a specific surface roughness have a potential to achieve the above objectives.

SOFC generates electricity by supplying two kinds of gases, namely fuel gas and oxidizing gas, respectively to an anode and a cathode, which are separated by the electrolyte sheet, and by performing electrochemical reactions in each electrode at a high temperature such as 600° C.-950° C. Even when the electrolyte sheet has the surface roughness mentioned above, the voltage of a single cell is as low as about 1V. Thus, in the actual operation of the fuel cell, it is necessary to stack plural single cells and connect them in series (stacking) to obtain the sufficient power. In this arrangement, while the adjacent cells are electrically connected, separators made of metal or ceramic are provided between the single cells to properly distribute the fuel gas and oxidizing gas to the anodes and cathodes respectively through a manifold. The separator is also called interconnector.

However, the electrolyte sheets having the surface roughness mentioned above does not satisfy all the requirements such as formability of electrodes on the electrolyte sheet, adhesion between the electrolyte sheet and the electrodes, reaction area of the electrode such as three-phase boundary, power generation performance, prevention of delamination of the electrodes over time, sealability of fuel gas and/or oxidizing gas between the periphery of the electrolyte sheet and the separator, handling strength, thermal shock resistance against heat cycles due to repeated temperature fluctuation between room temperature and 600° C.-950° C. caused by start/stop of SOFC. In other words, the electrolyte sheets having the surface roughness mentioned above do not satisfy some of these requirements.

For example, in the electrolyte sheet having a surface roughness specified in the Patent Document 2, the adherence of the electrolyte sheet to the electrode layers formed on both sides of the sheet, the reaction area of the electrode, and the power generation performance are improved. However, the electrolyte sheet can be cracked from its periphery when the electrodes are formed on the electrolyte sheet by screen printing, and when the electrolyte sheets and separators are alternately stacked. Therefore, careful handling is necessary.

PRIOR ART DOCUMENTS

Patent Documents

Patent Document 1: Japan Patent Application Publication 2000-281438

Patent Document 2: International Publication WO 2004/034492

Patent Document 3: Japan Patent Application Publication 2007-323899

SUMMARY OF THE INVENTION

Problem to be Solved by the Invention

The present invention was achieved in such circumstances. The purpose of the invention is to provide an electrolyte sheet for SOFC that has an optimal surface configuration to prevent the peripheral region of the sheet from being damaged during forming the electrodes and stacking by improving the handling strength of the electrolyte sheet as well as to maintain an excellent power generation performance by improving the thermal shock resistance and suppressing a gas leak. More specifically, the purpose of the present invention is as following: (1): To reduce the sheet damage of the peripheral region by improving the handling strength of the electrolyte sheet. Thereby, productivity of the cells is improved and the production cost of SOFC is reduced. Furthermore, leakage of fuel gas and/or oxidizing gas is prevented. (2) To provide the electrolyte sheet that can laminate the electrodes with excellent adhesiveness in the region other than the peripheral region. Thereby, the electrolyte sheet shows a stable and superior performance, preventing the decline of power generation performance caused by the delamination of the electrode.

The other purpose of the present invention is to provide a method of efficiently producing such a high-performance electrolyte sheet.

The other purpose of the present invention is to provide a single cell for SOFC and an SOFC that have an excellent strength and power generation property by utilizing such a high-performance electrolyte sheet.

Means to Solve the Problem

The electrolyte sheet for SOFC of the present invention has different surface roughnesses between the peripheral region and the region other than the peripheral region at least on one surface. The surface roughness Ra(b) in the peripheral region determined by an optical and laser-based non-contact three-dimensional profile measuring device is at least 0.05 μm and less than 0.3 μm. The surface roughness Ra(i) in the region other than the peripheral region determined by the optical and laser-based non-contact three-dimensional profile measuring device is at least 0.2 μm and at most 1.2 μm. And, the ratio of Ra(i) to Ra(b) (Ra(i)/Ra(b)) is more than 1 and at most 4. Here, the surface roughness Ra(b) and the surface roughness Ra(i) are arithmetic mean roughness values and parameters of the surface roughnesses determined in accordance with a German standard 'DIN-4768'.

The method of producing the electrolyte sheet of the present invention provides the electrolyte sheet for SOFC that has different surface roughnesses between the peripheral region and the region other than the peripheral region at least on one surface. This method includes a step of pressing at least one surface of an untreated greensheet with a roughening mold plate whose surface is roughened. In this method, the surface roughness Ra(b) in the peripheral region of the mold plate determined by the optical and laser-based non-contact three-dimensional profile measuring device is at least 0.05 μm and at most 3.0 μm. The surface roughness Ra(i) in the region other than the peripheral region of the mold plate is at least 0.2 μm and at most 10 μm (however, the surface roughness Ra(b)<the surface roughness Ra(i)). Here, the surface roughness Ra(b) and the surface roughness Ra(i) of the mold plate are the arithmetic mean roughness values, and parameters of the surface roughnesses determined in accordance with the German standard 'DIN-4768'.

The present invention also provides a single cell for SOFC containing an anode, a cathode and the electrolyte sheet of the present invention that is provided between the anode and the cathode. The anode and the cathode are provided in the region other than the peripheral region of the electrolyte sheet.

The present invention further provides an SOFC containing the single cell of the present invention mentioned above.

Effect of the Invention

The electrolyte sheet of the present invention has different surface roughnesses between the peripheral region and the region other than the peripheral region at least on one surface. Furthermore, the surface roughness Ra(b) in the peripheral region, the surface roughness Ra(i) in the region other than the peripheral region and these ratio are within the ranges mentioned above. By this configuration, handling strength of the electrolyte sheet is improved. Thus, the sheet is prevented from being damaged during forming the electrodes and stacking. Thereby, not only is the production cost of SOFC reduced, but the reliability of SOFC is also enhanced. Moreover, the electrolyte sheet of the present invention has enhanced power generation performance when being used for a single cell, and enhanced adhesiveness and improved delamination resistance to the electrodes. In addition, gas leak is well prevented when the electrolyte sheet is stacked as a cell. Therefore, the electrolyte sheet of the present invention has favorable characteristics as an electrolyte sheet for SOFC.

DETAILED DESCRIPTION OF THE INVENTION

To solve the problems described above, the inventor has conducted extensive and thorough research about the relation of manufacturing conditions of the electrolyte sheet and physical properties of the electrolyte sheet (especially the surface roughness and handling strength of the electrolyte sheet). As a result, the inventor found it possible not only to secure the gas leak resistance but also to improve the handling strength if a surface roughness described later is adapted to the electrolyte sheet. The inventor also identified the condition of reproducibly manufacturing the electrolyte sheets having such physical properties. As described in detail below, the inventor succeeded to realize an electrolyte sheet having an improved handling strength and a secured gas leak resistance as well as preventing the losses of adhesion to the electrodes and power generation performance by designing the surface roughness of the electrolyte sheet in the peripheral region, where a sealing material is applied to, and the surface roughness of the electrolyte sheet in the region other than the peripheral region, where the electrode is formed, based on their respective functions, and by setting the ratio of the surface roughnesses proper. Furthermore, the inventor also successfully established the process to easily manufacture such electrolyte sheets.

By using the manufacturing method of the present invention, the product can be obtained more reliably. However, since the indicators for obtaining the product is clarified in the present invention, it is of course possible to obtain the electrolyte sheet satisfying the purposes of the present invention even by the manufacturing methods other than the method specified by the present invention if manufacturing conditions are optimized. Specific configurations of the present invention are described in detail below.

In the peripheral region on the surface of the electrolyte sheet for SOFC, a gas sealing layer is usually formed along the peripheral end of the electrolyte sheet. This gas sealing layer generally has 1-8 mm (desirably 1.5-6 mm, and more desirably 2-5 mm) of a width from the peripheral end of the electrolyte sheet. In the middle region of the electrolyte sheet (region other than the peripheral region), electrode layers are formed. Thereupon, the inventor has conducted a research on the surface roughness of the peripheral region of the electrolyte sheet under the hypothesis in which there is an optimal surface roughness for the formation of the gas sealing layer that is different from the surface roughness optimal for the formation of the electrodes. As a result, the inventor confirmed that the electrolyte sheet shows a superior handling strength and a superior gas sealing if the peripheral region of at least one surface of the electrolyte sheet has a surface roughness different from a surface roughness in a region other than the peripheral region, more specifically the surface roughness Ra(b) in the peripheral region is at least 0.05 μm and less than 0.3 μm, the surface roughness Ra(i) in the region other than the peripheral region is at least 0.2 μm and at most 1.2 μm, and the ratio of Ra(i) to Ra(b) (Ra(i)/Ra(b), hereafter referred as 'Ra ratio') is more than 1 and at most 4. Here, the surface roughness Ra(b) and the surface roughness Ra(i) are arithmetic mean roughness values, are measured by an optical and laser-based non-contact three-dimensional profile measuring device, and are determined in accordance with a German standard 'DIN-4768'.

The surface roughness Ra(b) in the peripheral region of the electrolyte sheet is desirably at least 0.08 μm and less than 0.25 μm, and more desirably at least 0.1 μm and less than 0.2 μm. In the case the surface of the electrolyte sheet in the peripheral region is too smooth, particularly when Ra(b) is less than 0.05 μm, the handling strength becomes further better, but the gas sealability becomes insufficient because the anchoring of the electrolyte sheet to the sealant becomes weak. As a result, in the anode, leakage of the fuel gas can easily occur, and in the cathode, leakage of the air can easily occur. Therefore, the utilization efficiencies of the fuel and the air can be decreased. In particular, if the fuel gas leaks from the anode, the leaked fuel gas directly contacts with the air and burns. Therefore, in the place where the gas sealing is insufficient, there are concerns that a crack occurs in the cell because the temperature locally rises only in such a place, causing local thermal stress, and the power generation performance decreases because of the collapse of the electrode structure due to the volume change of the anode caused by the oxidation of the metal component (for example metal nickel) of the anode.

On the other hand, when the surface of the electrolyte sheet in the peripheral region is too coarse, particularly, when Ra(b) is more than 0.3 μm, the handling strength decreases. As a result, when the electrodes are printed, when the cells are produced by firing, and when the produced cells are stacked, cracks or breakage can easily occur from the peripheral region. Due to the damage of the cells, the power generation performance declines.

Further, in the electrolyte sheet of the present invention, the surface roughness Rz and the average peak spacing Sm of the sheet can also become important factors for controlling the sealing. Here, the surface roughness Rz is a mean roughness depth and determined in accordance with a German standard 'DIN-4768'. Furthermore, the average peak spacing Sm is a mean width of profile element and determined in accordance with a German standard 'DIN-4287'.

The electrolyte sheet particularly has a superior handling strength if the surface roughness Rz in the peripheral region is set as desirably at least 0.1 μm and at most 3.0 μm, more desirably at least 0.15 μm and at most 2.5 μm, and most desirably at least 0.2 μm and at most 2.0 μm. If Rz is less than 0.1 μm, the anchorage of the electrolyte sheet to the sealant can possibly be insufficient and the gas sealing may become unsatisfactory. When Rz is more than 3.0 μm, cracks and breakage can more easily occur from the peripheral region, and there is a possibility that the handling strength becomes problematic.

In the present invention, there is an occasion in which Sm (average peak spacing) of the electrolyte sheet, which correlates with the shape of the electrolyte sheet in its surface direction, in the peripheral region becomes a controlling factor that can significantly affect the damage of the sheet upon handling the electrolyte sheet. In order to enhance the handling strength of the electrolyte sheet, the average peak spacing Sm is desirably set as at least 0.01 μm and at most 3.0 μm, more desirably at least 0.05 μm and at most 2.5 μm, most desirably at least 0.1 μm and at most 2.0 μm. Since such an electrolyte sheet has the reduced number of acutely angled valleys, cracks originated from the sharp bottoms are suppressed. Therefore, the impact resistance of the electrolyte sheet, measured by the hammering test based on the tap sound described later, is improved, and the handling strength is enhanced.

Accordingly, the Ra and Rz specify the shapes of the electrolyte sheet in the thickness direction. In addition to these, by analyzing the average peak spacing Sm of the electrolyte sheet in the peripheral region, the relation between the three-dimensional shape of roughness in the peripheral region of the electrolyte sheet and the handling strength during actual handling of the electrolyte sheet became clear.

When the pitch between the peaks or between the valleys in the peripheral region of the electrolyte sheet is too small, specifically when Sm is less than 0.01 μm, it is implied that there are peaks and valleys in an extremely small space. As a result, the bottom shapes of many valleys tend to be acutely angled, and there can be an occasion that the handling strength decreases. On the other hand, when the pitch between the peaks or between the valleys in the peripheral region is too large, specifically when Sm is more than 3.0 μm, the durability of sealing against the repetition of temperature fluctuations may be inferior though superior handling strength can be obtained.

In the electrolyte sheet of the present invention, not only the surface roughness in the peripheral region but also the surface roughness in the region other than the peripheral region are specified. The region other than the peripheral region is about the same as a region in which the electrode is formed. The electrolyte sheet having the surface roughness Ra(i) of at least 0.2 μm and at most 1.2 μm in the area outside of the peripheral region shows a superior formation of the electrodes to the electrolyte sheet containing the same electrolyte materials but having Ra(i) outside of this range when the same electrode materials are used for both of the electrolyte sheet. In addition, the electrolyte sheet having the surface roughness Ra(i) within this range in the region outside of the peripheral region shows a superior power generation performance because electrochemical reaction field interfacing to the electrode (three-phase boundary) is well maintained. Furthermore, such an electrolyte sheet also has a superior adhesiveness to the electrodes and thus gives a stable power generation performance.

When Ra(i) is less than 0.2 μm, the effective contact area forming the three-phase boundary of solid electrolyte, electrode and pore decreases. Therefore, not only does the power generation performance as a generator, namely the amount of the power generated per unit area of electrode, decrease but the electrodes are also easily delaminated from the surfaces of the electrolyte sheet when the cell is exposed to high temperature for a long period of time such as sintering after forming the electrodes or using the cell, or when the cell is subjected to repeated thermal cycles between room temperature and high temperature.

Therefore, to avoid such problems, it is necessary to roughen the surface of the electrolyte sheet prior to forming the electrodes. However, when the surface roughness of the electrolyte sheet is too large, specifically when Ra(i) is more than 1.2 μm, workability of forming the electrodes and the stability of the formed electrode layer decrease. Thus, it is difficult to form the electrodes having a uniform thickness that contributes to improving the power generation performance. Furthermore, not only does the adhesion of the electrode layer decrease, but the strength of the electrolyte sheet is also reduced.

In the present invention, the surface roughnesses of the electrolyte sheet refer to the values determined following the electric contact-type measurements of the roughness parameters Ra and Rz in accordance with a German standard 'DIN-4768' revised in May, 1990. Sm (mean width of profile element) refers to the value determined following a German standard 'DIN-4287'. Furthermore, Ra, Rm and Sm are defined as the average value measured at four arbitrary locations in the peripheral region and the average value measured at nine arbitrary locations in the region other than the peripheral region. An optical and laser-based non-contact three-dimensional profile measuring device, which measures the values without contacting the surface of the electrolyte sheet, is used as a measuring device. The main principle of measurement by this device is described below.

A 780 nm laser emitted by a semiconductor laser light source focuses on the surface of the sample (namely surface of the electrolyte sheet) with 1 μm of a focus diameter through a movable objective lens. The regularly reflected light returns through the same optical path and uniformly forms images on four photodiodes through a beam splitter. When the light is regularly reflected on the surface of the rough sample, the regularly reflected light is dislocated and the images become uneven. A signal is immediately transmitted to resolve this dislocation, and the objective lens is controlled so that the focal point is always located on the surface of the sample. By detecting the amount of movement of the lens during this process by a light barrier measuring mechanism, precise measurement is achieved. Its specifications are 1 μm of spot diameter and 0.01% (maximum 0.01 μm) of resolution in the measurement range.

The German standards 'DIN-4287' and 'DIN-4768' define the measurements of electrical contact-type roughness parameters Ra, Rz and Sm. In the present invention, Ra, Rz and Sm are obtained in accordance with the German standards 'DIN-4768' and 'DIN-4287' using the measuring and analyzing method and program for Ra, Rz and Sm provided with the measuring device mentioned above.

Generally, the surface roughness is evaluated by a contact-type surface roughness measuring device in which a diamond probe contacts with the surface of the sample and the phase difference of the surface is converted to an electric signal. However, the diameter of the probe is at least 2 μm, which is larger than the focus of the laser by the laser optical device. In addition, the probe gets stuck in the valley and peak. Therefore, the surface roughness obtained using the contact-type surface roughness measuring device tends to not strongly correlate to the power generation performance of SOFC having the electrolyte sheet. However, the optical and laser-based non-contact profile measuring method can more accurately provide the shape and roughness of the surface than the contact measuring method. Therefore, in the present invention, the surface roughness of the electrolyte sheet is given by the value of the surface roughness measured by the optical and laser-based non-contact profile measuring device.

Desirable materials of the electrolyte sheet of the present invention are exemplified by a ceramic sinter containing at least an oxide selected from the group consisting of zirconia-based oxide, $LaGaO_3$-based oxide and ceria-based oxide.

Desirable zirconia-based oxides are exemplified by a solid solution of a zirconia-based oxide containing one or plural oxides selected from the group consisting of alkaline earth metal oxide such as MgO, CaO, SrO and BaO, rare earth metal oxide such as $Sc_2O_3$, $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$ and $Yb_2O_3$, $Bi_2O_3$ and $In_2O_3$ as a stabilizer. The desirable zirconia-based oxides are also exemplified by a dispersion strengthened zirconia-based oxide to which $Al_2O_3$, $TiO_2$, $Ta_2O_5$, $Nb_2O_5$ or the like are added as a dispersion strengthening agent in addition to the above-mentioned oxides. Particularly desirable zirconia-based oxide is a zirconia stabilized with an oxide containing at least one element selected from the group consisting of scandium, yttrium, cerium and ytterbium.

The $LaGaO_3$-based oxide is exemplified by a complex oxide having perovskite crystal structure, in which La and Ga are partially substituted and solid-soluted with Sr, Y or Mg that has lower valence than those of the La and Ga. The complex oxide is exemplified by $La_{1-x}Sr_xGa_{1-y}Mg_yO_3$ such as $La_{0.9}Sr_{0.1}Ga_{0.8}Mg_{0.2}O_3$, $La_{1-x}Sr_xGa_{1-y}Mg_yCo_2O_3$, $La_{1-x}Sr_xGa_{1-y}Fe_yO_3$, and $La_{1-x}Sr_xGa_{1-y}Ni_yO_3$.

Desirable ceria-based oxide is exemplified by a ceria-based oxide doped with one or plural oxides selected from the group consisting of CaO, SrO, BaO, $Ti_2O_3$, $Y_2O_3$, $La_2O_3$, $Pr_2O_3$, $Nd_2O_3$, $Sm_2O_3$, $Eu_2O_3$, $Gd_2O_3$, $Tb_2O_3$, $Dy_2O_3$, $Er_2O_3$, $Tm_2O_3$, $Yb_2O_3$, PbO, $WO_3$, $MoO_3$, $V_2O_5$, $Ta_2O_5$ and $Nb_2O_5$.

The above-mentioned oxide may be used alone or as a combination of at least two of them if necessary. Of the examples mentioned above, a tetragonal and/or cubic zirconium oxide, which is stabilized with 3-10 mol % yttrium oxide, 4-12 mol % scandium oxide, or 4-15 mol % of ytterbium oxide, is particularly desirable to obtain the electrolyte sheet having superior thermal properties, mechanical properties, chemical properties and oxygen ion conductivity. Of these zirconium oxides, zirconia stabilized with 8-10 mol % of yttrium oxide (8YSZ-10YSZ), zirconia stabilized with 10 mol % of scandium oxide and 1-2 mol % of ceria (10Sc1CeSZ-10Sc2CeSZ), and zirconia stabilized with 10 mol % of scandium oxide and 1 mol % of alumina (10Sc1AlSZ) are optimal.

The form of the electrolyte sheet is not particularly limited. The form of the electrolyte sheet is exemplified by planar, curved, membranous, cylindrical, cylindrical planar and honeycomb forms. The electrolyte sheet made of a dense sintered body having a thickness of at least 50 μm and at most 400 μm, more desirably at least 100 μm and at most 300 μm, and an area of at least 50 cm² and at most 900 cm² is suitable as an electrolyte sheet for ESC and SOFC.

Figure 2:
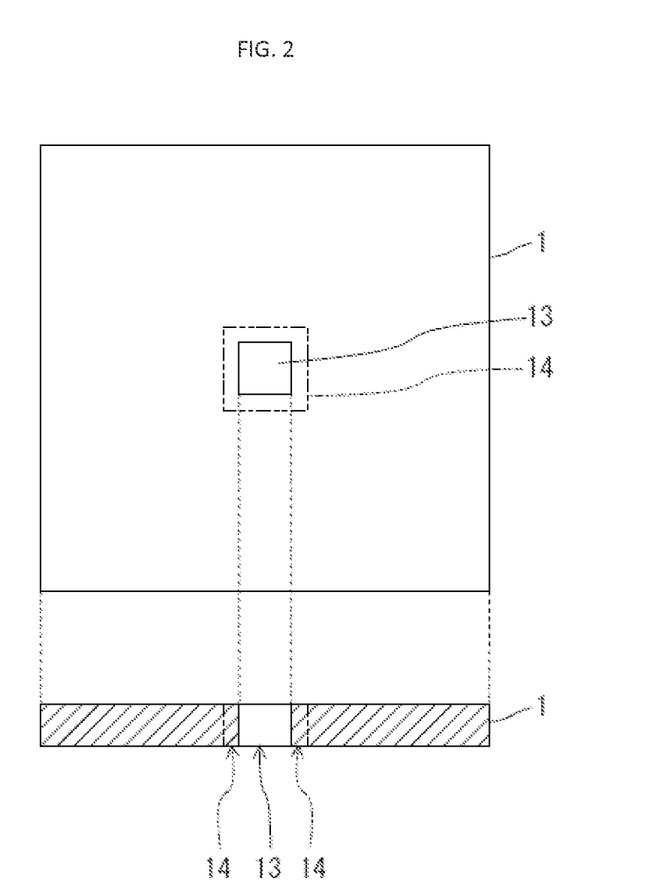
FIG. 2 is a plan view and a cross-sectional view of an example of an electrolyte sheet comprising a hole.

The shape of the electrolyte sheet can be any shape including a circular shape, an elliptical shape and a rectangular shape having rounded corners. For example, as shown in FIG. 2, the sheet may have one or plural holes 13 having a circular shape, an elliptical shape, and a rectangular shape having rounded corners or the like. The area of the sheet is desirably at least 80 cm² and more desirably at least 100 cm². When the sheet contains the hole(s) 13, the area means the area of the sheet including the area of the hole(s) 13 (area determined by the outline of the sheet). Although self-evident, the peripheral region 14 of the hole 13 is also included in the peripheral region of the electrolyte sheet according to the embodiments of the present invention.

Other desirable form and shape of the electrolyte sheet is the electrolyte sheet made of a membranous dense sintered body, on one surface of which the anode is laminated. The dense sintered body desirably has a thickness of at least 5 μm and at most 50 μm, more desirably at least 10 μm and at most 30 μm, and a surface area of at least 20 cm² and at most 900 cm², more desirably at least 25 cm² and at most 400 cm². This sheet is optimal as an electrolyte for anode-supported cell (ASC). Such an electrolyte sheet may also be coupled to an anode substrate, which functions as the anode.

In the present invention, the handling strength of the electrolyte sheet is evaluated in accordance with the test for thermal shock resistance defined in JASO Standard M505-87, which is the automotive standard defined by the Japanese Automotive Standards Organization. In this test, the electrolyte sheet is placed on a flat metal mesh at room temperature (15-30° C.) so that at least 8 mm of a width from the periphery of the electrolyte sheet is not supported by the mesh. At least four places of the peripheral region of the electrolyte sheet are lightly tapped with a metal rod (90° angles between the places when the four places are hit). If none of the tapping sounds is a dull metallic sound, the sample is judged as pass as not being cracked. Whether the metallic sound is dull is determined comparing with a reference sound generated from the electrolyte sheet whose peripheral region is cracked, testing in the same way. When it is difficult to judge pass or cracked, the electrolyte sheet is kept in an electric furnace at 300° C. for 1 hour. Immediately after removed from the electric furnace, the same test is quickly repeated at room temperature. The same test is repeated every time as the temperature in the electric furnace is sequentially increased with a step of 100° C.

To efficiently produce the electrolyte sheet having surface roughnesses specified in the present invention, it is desirable to include the step of pressing at least one surface of an untreated green sheet with a mold plate that has respectively different surface roughnesses (Ra) between the peripheral region and the region other than the peripheral region. This method utilizes the mold plate that has at least 0.05 µm and at most 3.0 µm of a surface roughness Ra(b) in its peripheral region, determined by the optical and laser-based non-contact three-dimensional profile measuring device, and that has at least 0.2 µm and at most 10 µm of a surface roughness Ra(i) in the region other than the peripheral region (here, surface roughness Ra(b)<surface roughness Ra(i)). By using such a mold plate, it is possible to easily roughen the surface in the region of the green sheet corresponding to the peripheral region of the electrolyte sheet and the surface in the region of the green sheet corresponding to the region of the electrolyte sheet outside of the peripheral region at the same time or at different timings so that each region has a different but aimed roughness.

Generally used methods are used to produce the above-mentioned untreated greensheet for the electrolyte sheet. Specifically, a slurry containing a raw material powder of the electrolyte, an organic binder, a dispersing agent and a solvent, and optionally a plasticizer and a defoaming agent, is casted into a tape form by spreading the slurry on a polymer film, which is processed to be releasable, by doctor blade, calendar method and extrusion method or the like. The formed tape is dried by evaporating the solvent. Thereby, a long green tape is produced. Then, this green tape is cut into a certain shape to obtain the untreated green sheet for the electrolyte sheet.

The binder used for producing the long green tape is not particularly limited, and conventionally known organic binders can be used. The organic binders are exemplified by ethylene copolymers, styrene copolymers, acrylate and methacrylate copolymers, vinyl acetate copolymers, maleic acid copolymers, vinyl butyral resins, vinyl acetal resins, vinyl formal resins, vinyl alcohol resins, waxes and celluloses such as ethyl cellulose.

Among these, in the view point of green tape formability, strength of the green tape and thermal decomposition during firing, (meth)acrylate copolymers having a number average molecular weight of 20,000-250,000, more desirably 50,000-200,000 are recommended. Such (meth)acrylate copolymers are desirably obtained by polymerizing or copolymerizing at least one monomer selected from the group consisting of alkyl acrylates having an alkyl group of 10 carbon atoms or less such as methyl acrylate, ethyl acrylate, propyl acrylate, butyl acrylate, isobutyl acrylate, cyclohexyl acrylate, and 2-ethylhexyl acrylate; alkyl methacrylates having an alkyl group of 20 carbon atoms or less such as methyl methacrylate, ethyl methacrylate, butyl methacrylate, isobutyl methacrylate, octyl methacrylate, 2-ethylhexyl methacrylate, decyl methacrylate, dodecyl methacrylate, lauryl methacrylate and cyclohexyl methacrylate; hydroxyalkyl acrylates or hydroxyalkyl methacrylates having a hydroxyalkyl group such as hydroxyethyl acrylate, hydroxypropyl acrylate, hydroxyethyl methacrylate and hydroxypropyl methacrylate; aminoalkyl acrylates or aminoalkyl methacrylates such as dimethylaminoethyl acrylate and dimethylaminoethyl methacrylate; and monomers having a carboxylic group such as acrylic acid, methacrylic acid, maleic acid and half esters of maleic acid such as monoisopropyl maleate.

These organic binders can be used alone or by combining two or more of them if necessary. A particularly desirable binder is a polymer from a monomer containing at least 60 mass % of isobutyl methacrylate and/or 2-ethylhexyl methacrylate.

The ratio of the binder to the raw material powder is desirably at least 5 mass parts and at most 30 mass parts, and more desirably at least 10 mass parts and at most 20 mass parts of the binder to 100 mass parts of the raw material powder. If the amount of the binder used is insufficient, the strength and flexibility of the green tape tend to be unsatisfactory, and it may not be possible to adequately roughen the surface of the green tape to give the desired surface roughness. On the other hand, if the binder is excess, it is difficult not only to adjust the viscosity of the slurry but also to obtain a flat electrolyte sheet because the decomposition and release of the binder component become excessive and intense during firing.

The solvents used for producing the green tape is exemplified by water; alcohols such as methanol, ethanol, 2-propanol, 1-butanol and 1-hexanol; ketones such as acetone and 2-butanone; aliphatic hydrocarbons such as pentane, hexane and butane; aromatic hydrocarbons such as benzene, toluene, xylene and ethylbenzene; and acetate esters such as methyl acetate, ethyl acetate and butyl acetate. These solvents may be used alone or as a combination of two or more based on necessity. The amount of the solvent added may be appropriately adjusted by watching the viscosity of the slurry. The viscosity of the slurry is adjusted to be desirably 1-50 Pa·s, and more desirably 2-20 Pa·s.

Upon preparation of the slurry, a dispersant can be added to the slurry based on necessity to promote the peptization or dispersion of the raw material powder. The dispersants are exemplified by polymeric electrolytes such as poly(acrylic acid) and poly(ammonium acrylate); organic acids such as citric acid and tartaric acid; copolymers of isobutylene or styrene and maleic anhydride, their ammonium salts or amine salts; butadiene-maleic anhydride copolymer, its ammonium salt. In addition, a plasticizer can be added to the slurry based on necessity to make the green sheet more flexible. The plasticizers are exemplified by phthalate esters such as dibutyl phthalate and dioctyl phthalate; glycols or glycol ethers such as propylene glycol; polyesters such as polyphthalates, polyadipates and polysebacates. Furthermore, a surfactant or a defoaming agents can also be added to the slurry if necessary.

After preparing the slurry containing the raw material and the other components mentioned above, the slurry is casted into the tape form by various methods mentioned above. By drying the casted slurry, the long green tape is obtained. The untreated green sheet for the electrolyte sheet is obtained by cutting the green tape into a desired size and shape. The drying condition is not particularly limited. For example, the casted slurry may be dried at a fixed temperature of room temperature −150° C., or it may be dried by gradually or sequentially increasing the temperature such as 50° C., 80° C. and then 120° C.

The term 'untreated' for the green sheet means that a certain treatment has not been provided to the green sheet to roughen the surface of the green sheet.

Another form of the electrolyte sheet for SOFC in the present invention is an electrolyte membrane in the ASC half cell in which the electrolyte and the anode is bonded and integrated. One method of producing the untreated electrolyte sheet for the electrolyte membrane is to form a film by coating the paste for the electrolyte, composed of the above composition, on the anode green sheet by screen printing or coating, and to dry and evaporate the dispersion medium. The other method is to stack the anode green sheet and the electrolyte green sheet and to press and bind this stack. Yet, the other method is to print a paste for anode on a thin-film electrolyte sheet, obtained by firing a green tape having 5-60 μm of thickness, and to fire the printed electrolyte sheet. In any case, it is possible to use an anode substrate green sheet instead of the anode green sheet.

Next, the untreated green sheet is pressed with a roughening mold plate whose surface is roughened. In this process, the roughening mold plates are placed on either or both of the upper and lower mounting apparatuses of the pressing machine. Then, the untreated green sheet for the electrolyte sheet is inserted between the mold plates and pressed. Thereby, the rough surface of the mold plate is transferred to the surface of the green sheet and the surface roughness of the green sheet becomes in the optimal range of the present invention. In this treatment, the surface roughness of the green sheet can be easily modified by the surface roughness of the mold plate, the pressing pressure, and the duration time of pressing. Furthermore, the surface roughness of the green sheet can also be modified by controlling the temperature during pressurization depending on the binder added in the raw material slurry.

In order to accurately transfer the surface roughness of the mold plate to the surface of the green sheet and to obtain the surface roughness within the range of the present invention, it is desirable that the tensile elongation at break of the green sheet in the tensile test is at least 5% and at most 50%, and the tensile yield strength is at least 2.0 MPa and at most 20 MPa. It is more desirable that the tensile elongation at break is at least 8% and at most 30% and the tensile yield strength is at least 3.0 MPa and at most 15 MPa.

If the tensile elongation at break is less than 5% and the tensile yield strength is more than 20 MPa, there is a possibility that the shape of the surface of the mold plate is not sufficiently transferred to the green sheet and the roughening may be unsatisfactory. On the other hand, if the tensile strength at break is more than 50% and the tensile yield strength is less than 2.0 MPa, a problem can occur in that detaching the green sheet from the mold plate becomes difficult.

The tensile elongation at break and the tensile yield strength are measured in accordance with the testing method for tensile properties of plastics as defined in JIS K-7113. Specifically, the green tape is cut into the shape of type No. 2 to form a test sample. The test sample is set in the Universal Testing Machine (Model 4301, Instron Japan Corp.), and both ends of the test sample are held by jigs. The test sample is pulled at a tensile speed of 100 mm/min and broken. Thereby, the tensile elongation at break and the tensile yield strength are measured.

The mold plate used for pressing the green sheet is not particularly limited as long as the surface of the mold plate is appropriately roughened and the mold plate has strength and flexibility enough for the green sheet to be detached after pressing. The materials of the mold plate are exemplified by tungsten carbide, stainless steel, die steel, stellite, special steel and cemented carbide. Although any of them can be used, the mold plate made of cemented carbide such as tungsten carbide is optimally used because of its superior abrasion resistance, hardness, and property for electric spark machining.

The method of roughening the surface of the mold plate is not particularly limited, and conventional methods such as blasting, grinding, electric spark machining, etching or the like may be used. However, in order to produce the electrolyte green sheet that is uniformly roughened, it is necessary to roughen the mold plate uniformly. The electric spark machining is desirable as a method to uniformly roughen the mold plate. In the electric spark machining, the degree of roughening is adjusted by the intensity of the current and the duration of processing time.

The uniformity of the surface roughness of the mold plate is represented by the standard deviation of Ra(arithmetic mean roughness) of the surface of the mold plate that is measured in plural locations respectively in the peripheral region of the mold plate and in the region other than the peripheral region. More specifically, the surface roughnesses are measured in four places in the peripheral region and in nine places in the region other than the peripheral region by the optical and laser-based non-contact three-dimensional profile measuring device, and the standard deviation of the measured values is calculated. The standard deviation, namely the uniformity, is desirably 0.3 or less.

The surface roughnesses Ra and Rz as well as the mean width of the profile element Sm are used as the indicators of the surface roughnesses of the mold plate used for roughening. The surface roughness Ra(b) in the peripheral region of the mold plate is desirably at least 0.05 μm and at most 3.0 μm, and the surface roughness Ra(i) in the region other than the peripheral region is desirably at least 0.2 μm and at most 10 μm. The surface roughness Rz in the peripheral region of the mold plate is desirably at least 0.1 μm and at most 6.0 μm, and more desirably at least 0.15 μm and at most 5.0 μm. Besides, the mean width of the profile element Sm in the peripheral region of the mold is desirably at least 0.01 μm and at most 6.0 μm, and more desirably at least 0.05 μm and at most 5.0 μm.

The pressing pressure during pressing the green sheet is for example approximately at least 1.96 MPa and at most 58.8 MPa, and desirably approximately at least 2.94 MPa and at most 49.0 MPa. The duration time of pressing is for example at least 0.1 sec and at most 600 sec, and desirably at least 1 sec and at most 300 sec. Under these conditions, the untreated green sheet for the electrolyte sheet is appropriately roughened corresponding to the roughened surface of the mold plate. Thus, the electrolyte sheet having the surface roughness specified by the present invention is reliably produced. In the pressing process, since it is necessary to transfer different surface roughnesses from the mold to the green sheet, it is desirable to put a shim (spacer) or a cushioning sheet and an auxiliary sheet for roughening between the mold plate and a pedestal on which the mold plate is mounted. Thereby, the electrolyte sheet having the surface roughness specified in the present invention can be produced more reliably.

To efficiently detach the roughened electrolyte green sheet from the mold plate after pressing, it is desirable to provide at least one air vent aperture in the mold plate. Then, it is desirable to pump an air through the air vent aperture after pressing. Thereby, it is possible to quickly and smoothly detach the roughened electrolyte green sheet without damaging it.

The diameter of the air vent aperture provided on the mold plate is desirably about at least 0.1 mm and at most 1 mm.

Since the electrolyte green sheet is not roughened at the place where the air vent is provided, it is better that the air vent aperture is smaller. On the other hand, if the air vent aperture is too small, there is a concern that the green sheet may not be satisfactorily detached from the mold plate. Thus, the diameter is desirably set at least 0.1 mm. This is similar about the number of apertures. Although it is better that the number of apertures is smaller for roughening the electrolyte green sheet, it is better that the number of apertures is larger for efficiently detaching the green sheet. Therefore, the number of apertures is desirably at least 2 and at most 80, and more desirably at least 4 and at most 60 though the suitable number of the air vent apertures depends on the area of the electrolyte sheet produced.

The electrolyte green sheet whose surface is roughened by the pressing step described above is fired. Thereby, the electrolyte sheet of the present invention is obtained. The condition of firing is not particularly limited, and standard methods may be employed. For example, to eliminate the organic components such as binder and plasticizer from the surface-roughened electrolyte green sheet, the green sheet is heated at 150-600° C., desirably 250-500° C., for about 5-80 hours. Then, the green sheet is fired at 1000-1600° C., desirably at 1200-1500° C. for 2-10 hours. Thereby, the electrolyte sheet of the present invention whose surface is roughened is obtained.

The surface roughness of the electrolyte sheet obtained by the method described above is approximately 70-90% of the surface roughness of the electrolyte green sheet. Therefore, to obtain the electrolyte sheet having the designed surface roughness, conditions of the pressing step can be adjusted so that the electrolyte green sheet having a similar surface roughness is obtained.

The single cell for SOFC of the present invention is characterized by containing the electrolyte sheet whose surface is roughened as described above. Specifically, the single cell for SOFC of the present invention contains an anode, a cathode and the electrolyte sheet of the present invention provided between the anode and the cathode. And, the anode and the cathode are provided in the region other than the peripheral region of the electrolyte sheet. On at least one surface of the electrolyte sheet of the present invention, the surface roughness (Ra) in the peripheral region and the surface roughness in the region other than the peripheral region are different from each other. This electrolyte sheet has a superior gas sealability due to the improved adhesion to an sealing material as well as a superior power generation efficiency due to the improved adhesion to the electrodes compared to an electrolyte sheet whose surface is not roughened and an electrolyte sheet having the same surface roughnesses in the peripheral region and in the region other than the peripheral region. Therefore, the cell for SOFC of the present invention can generate the power not only efficiently but also stably for a long period of time.

The single cell for SOFC is produced by forming the anode on one side and the cathode on the other side of the electrolyte sheet by screen printing or the like. The order of forming the anode and the cathode is not particularly limited. However, the electrodes for which lower temperature for firing is necessary may be formed first as a layer form on the electrolyte sheet, and then fired. Or, the anode and cathode may be fired simultaneously. An intermediate layer that functions as a barrier layer may be formed between the electrolyte sheet and the cathode layer to prevent the formation of a high resistance component due to solid phase reaction between the electrolyte and the cathode. In this case, the anode is formed on the side opposite to the side where the intermediate layer is formed or to be formed, and the cathode is formed on the intermediate layer. The order of forming the intermediate layer and the anode is not particularly limited. The intermediate layer and the anode may be formed simultaneously by coating the paste of intermediate layer and the paste of anode on each side of the electrolyte sheet respectively, then drying and firing.

Conventionally known materials are used for forming the anode, the cathode, and the intermediate layer. Furthermore, standard methods and conditions can be employed for coating, drying and firing the pastes for these layers.

The single cell of the present invention in which the anode and the cathode are formed on the electrolyte sheet, or the cell of the present invention in which the anode, the cathode and the intermediate layer are formed on the electrolyte sheet has superior durability and power generation efficiency because the peripheral region of the electrolyte sheet has a surface roughness that is optimal for gas sealing for fuel gas and air and the contact area between the electrolyte and the electrode or the intermediate layer is large. Accordingly, the method of the present invention enables to produce the surface-roughened electrolyte sheet and the surface-roughened electrolyte greensheet that is the precursor of the electrolyte sheet, which can be used for high-performance SOFC. Therefore, the present invention contributes to the commercialization of the fuel cell.

EXAMPLES

Below, the present invention is explained in more detail using Examples. The present invention is not intended to be limited by the following Examples. It is possible to practice the present invention modifying the following Examples so that it fits to the scope of the description explained above or below. All of such modifications are still within the scope of the present invention.

Example 1

(1) Production of Untreated Green Sheet for Solid Electrolyte

The following components were prepared in a nylon mill, in which zirconia balls were also put: 100 mass parts of 10 mol % scandium oxide-1 mol % cerium oxide-stabilized zirconia powder (manufactured by Daiichi Kigenso Kagaku Kogyo Co., Ltd., product name '10Sc1CeSZ', $d_{50}$ (median diameter): 0.6 μm) as a raw material powder, 16 mass parts (solid basis) of methacryl copolymer-based binder (number average molecular weight: 100,000, glass transition temperature: −8° C.), 2 mass parts of sorbitan trioleate as a dispersant, 3 mass parts of dibutyl phthalate as a plasticizer, and 50 mass parts of toluene/isopropanol mixed solvent (mass ratio=3/2) as a solvent. The mixture was milled in the nylon mill for 40 hours. Thereby, the slurry was prepared. The obtained slurry was transferred to a jacketed, cylindrical, round-bottom, vacuum degassing container that had 50 L of an internal volume and that was equipped with an anchor-type stirrer. The slurry was condensed and degassed, and its viscosity at 25° C. was adjusted to be 3 Pa·s under vacuum (approximately 4–21 kPa), at 40° C. of the jacket temperature, and by rotating the stirrer at 30 rpm of a rotational speed. Thereby, the coating slurry was obtained. This coating slurry was continuously casted on a polyethylene terephthalate (PET) film by doctor blade. Then, the casted slurry was dried at 40° C., 80° C. and 110° C. sequentially. Thereby, a long, untreated green tape for solid electrolyte was obtained. This green tape was cut into a circular shape having approximately 160 mmϕ.

Then, the green sheet was detached from the PET film. Thereby, an untreated green sheet for electrolyte was obtained.

(2) Mold Plate for Surface Roughening

A circular tungsten carbide mold plate having approximately 160 mmφ was processed by electric spark machining with different conditions in the peripheral region, approximately 6.7 mm wide from the peripheral end, and in the region other than the peripheral region (middle region). The surface roughness of the machined mold plate was measured by an optical and laser-based non-contact three-dimensional profile measuring device (manufactured by UBM Co., Ltd., MicroFocus Expert, model 'UBM-14'). Ra, Rz and Sm were measured at four arbitrary locations in the peripheral region (region 5 mm wide from the peripheral end) and at nine arbitrary locations in the middle region. In the peripheral region, the average Ra was 0.10 μm, Rz was 1.2 μm, and Sm was 0.5 μm. In the middle region, the average Ra was 0.8 μm.

(3) Roughening the Green Sheet

The mold plate for roughening the green sheet obtained in (2) was installed at top and bottom stages of a compression molding machine (manufactured by Shinto Metal Industries Corporation, model 'S-37.5'). The 10Sc1CeSZ untreated green sheet prepared in (1) was placed on the lower mold plate. This green sheet was sandwiched by slowly lowering the upper mold plate. Then, the green sheet was pressed by the mold plates with 9.8 MPa of a pressure for 1 sec. Then, the upper mold plate was slowly lifted, and the roughened green sheet was detached from the mold plate.

(4) Firing of the Roughened Green Sheet

Next, the roughened green sheets obtained in (3) were debinderd by sandwiching the green sheets with 99.5% alumina porous plates (porosity: 30%) having a maximum waviness height of 10 μm. Then, the debinderd green sheets were fired at 1420° C. for 3 hours. Thereby, a 10Sc1CeSZ electrolyte sheets having approximately 120 mmφ and 0.28 mm of a thickness were obtained. The surface roughness of this electrolyte sheet was measured in the same way as (2). In the 5 mm-wide region from the peripheral end (peripheral region of the electrolyte sheet of this Example), Ra(b) was 0.14 μm, Rz was 1.8 μm, and Sm was 0.7 μm as the average of four arbitrary locations. In the middle region other than the peripheral region, Ra(i) was 0.5 μm as the average of arbitrary nine locations.

(5) Production of the Single Cell for SOFC

The single cell for SOFC was produced by forming an anode and a cathode on the respective surfaces of the 10Sc1CeSZ electrolyte sheet. More explicitly, by screen printing, an anode paste was coated on one surface of the 10Sc1CeSZ electrolyte sheet in the region of approximately 110 mmφ excluding the 5 mm-wide region from the peripheral end (peripheral region). The composition of the anode paste was 70 mass parts of nickel oxide powder ($d_{50}$ (median diameter): 0.9 μm) obtained by thermal degradation of basic nickel carbonate, 15 mass parts of ceria particles (commercially available 20 mol % gadolinium-doped ceria powder) and 15 mass parts of zirconia particles (commercially available 8 mol % yttrium oxide-stabilized zirconia powder). By the same way, a paste for the intermediate layer composed of 20 mol % samarium-doped ceria was coated on the other surface of the electrolyte sheet in the region of approximately 110 mmφ excluding the 5 mm-wide region from the peripheral end (peripheral region). The coated electrolyte sheet was fired at 1300° C. Thereby, the anode and the intermediate layer were formed on the electrolyte sheet.

Next, by screen printing, a cathode paste was coated on the intermediate layer. The composition of the cathode paste was 80 mass parts of commercially available strontium-doped lanthanum iron cobaltate ($La_{0.6}Sr_{0.4}Fe_{0.8}CO_{0.2}O_3$) powder and 20 mass parts of commercially available 20 mol % gadolinium-doped ceria powder. The sheet was fired at 950° C., and the four-layered cell was obtained.

Example 2

A roughened electrolyte sheet and a cell containing this electrolyte sheet were produced in the same way as Example 1 except roughening the untreated greensheet obtained in Example 1 with a roughening mold plate, which had 0.18 μm of Ra, 3.0 μm of Rz, and 3.3 μm of Sm as the average of four arbitrary locations in the peripheral region and which had 0.6 μm of Ra as the average of the nine arbitrary locations in the region other than the peripheral region. The results are shown in Table 1.

Comparative Example 1

A roughened electrolyte sheet and a cell containing this electrolyte sheet were produced in the same way as Example 1 except roughening the untreated greensheet obtained in Example 1 with a roughening mold plate, which had 0.05 μm of Ra, 0.13 μm of Rz, and 0.01 μm of Sm as the average of four arbitrary locations in the peripheral region and which had 0.8 μm of Ra as the average of the nine arbitrary locations in the region other than the peripheral region. The results are shown in Table 1.

Comparative Example 2

A roughened electrolyte sheet and a cell containing this electrolyte sheet were produced in the same way as Example 1 except roughening the untreated greensheet obtained in Example 1 with a roughening mold plate, which had 6.7 μm of Ra, 13.9 μm of Rz, and 10.1 μm of Sm as the average of four arbitrary locations in the peripheral region and which had 0.9 μm of Ra as the average of the nine arbitrary locations in the region other than the peripheral region. The results are shown in Table 1.

Tests were conducted on the electrolyte sheets and the cells produced by Example 1, Example 2, Comparative Example 1 and Comparative Example 2 as explained below.
(Hammering Test)

Each of the 120 mmφ of the electrolyte sheets obtained in the Example 1, Example 2, Comparative Example 1 and Comparative Example 2 was mounted on a flat metal nickel mesh having 80 mmφ and 10 mm of thickness. The position of the electrolyte sheet was adjusted so that the center of the electrolyte sheet and the center of the mesh were positioned approximately at the same place. The region (peripheral region) of about 20 mm width from the peripheral end of the electrolyte sheet was not supported by (not in contact with) the mesh. In this state, four places in the peripheral region of the electrolyte sheet that were angled by 90° to each other were lightly tapped with a metal rod. When none of the tapping sounds was a dull metallic sound, it was determined that there were no cracks. In other words, when all the four places generated the metallic sounds, the electrolyte sheet was evaluated as 'Good'. When two or less places generated the metallic sounds, it was determined that the cracks were surely present, and the electrolyte sheet was evaluated as 'Fail'. When three places generated the metallic sounds, it was evaluated as 'Pass' at that moment because it was difficult to clearly judge the existence of cracks. To determine if the metallic sound was dull, the tapping sound of the electrolyte sheet was compared with the tapping sound of an electrolyte sheet having cracks in its peripheral region as a reference that was tapped in the same way. When the evaluation was 'Good' or 'Pass', the electrolyte sheet was kept in an electric furnace for 1 hour at 300° C. Then the electrolyte sheet was removed from the electric furnace, and the test was immediately repeated at room temperature. When the evaluation was 'Good' or 'Pass', the test was repeated increasing the internal temperature of the electric furnace by a step of 100° C. from 300° C. to 400° C. and to 500° C. sequentially. Results are shown in Table 1.

All the electrolyte sheets of the present invention generated metallic sounds even at 500° C. by the hammering test, and it was determined that cracks were absent in the peripheral region of the electrolyte sheet.

On the other hand, the electrolyte sheet of Comparative Example 1, which had less than 0.05 µm of a surface roughness Ra(b) in its peripheral region, generated the metallic sound at all four places at room temperature. However, it generated the metallic sound at three places at 300° C. and at only one place at 500° C. This is considered that cracks occurred by thermal history because there was a large difference in the surface roughnesses between the peripheral region of the electrolyte sheet and the region other than the peripheral region, in other words because Ra ratio (Ra(i)/Ra(b)) was large. The electrolyte sheet of Comparative Example 2 that had a large surface roughness in its peripheral region generated metallic sounds at only two places by the hammering test at room temperature. Therefore, it was determined that cracks were present in the peripheral region.

(Gas Leak Test)

Figure 1:
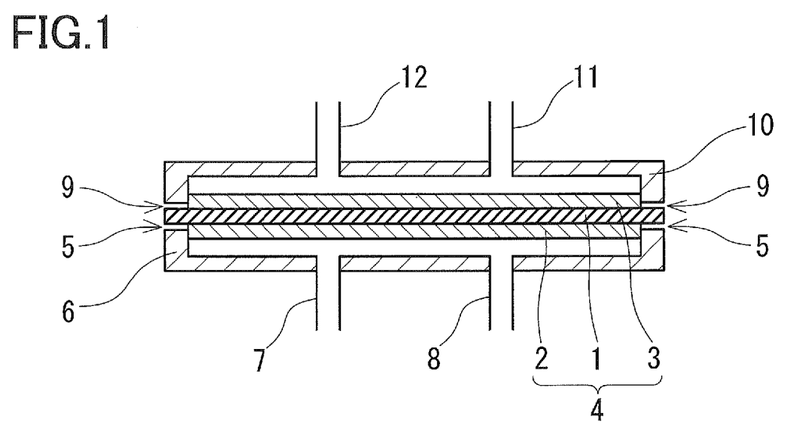
FIG. 1 is a schematic cross-sectional view showing the configuration of a power generation testing device for a single cell stack.

A sealant and a metal separator were attached to each of the electrolyte sheets obtained in Example 1, Example 2, Comparative Example 1 and Comparative Example 2. This assemble was heated at 950° C. in an electric furnace. Thereby, a single cell stack for power generation test as shown in FIG. 1 was produced, wherein the peripheral region of the electrolyte sheet 1 was bonded to a metal separator 6 on an anode side and a metal separator 10 on a cathode side.

The sealant used was a molded sheet made of potassium oxide-alumina-silica glass. This sealant was prepared from a slurry obtained by mixing a glass powder having 20 µm of an average particle diameter and made of $SiO_2$ (50 mass %)-$Al_2O_3$ (18 mass %)-$K_2O$ (12 mass %)-ZnO (12 mass %)-$Na_2O$ (8 mass %) in a PVA aqueous solution. Then, the slurry was formed into a sheet by doctor blade. The coefficient of thermal expansion of the glass was $10.3 \times 10^{-6}$/K, and the softening point was 885° C.

A fuel gas supply pipe 7 and a fuel gas exhaustion pipe 8 in each of the SOFC single cell stacks in the electric furnace were connected to a fuel gas flow system. And, an air supply pipe 11 and an air exhaustion pipe 12 were connected to an air flow system. The temperature was raised at a rate of 200° C./hr. After the temperature reached a certain temperature, air was supplied to both the fuel gas flow system and the air flow system for one hour. Then, the temperature was lowered at a rate of 200° C./hr, spending 12 hours to cool the furnace below 200° C. This cycle was defines as a heat cycle, and the heat cycle was repeated. The amounts of air supply were 2 NLM (normal liter per minute) respectively. The amounts of the exhausted air in the anode side and the cathode side were measured after 1 heat cycle, 10 heat cycles and 30 heat cycles. Then, the gas leak rate was calculated. Results are shown in Table 1.

The gas leak rates of the cells using the electrolyte sheets of the present invention (electrolyte sheets of Examples 1 and 2) after 10 heat cycles were both 0%. On the other hand, the cell using the electrolyte sheet of Comparative Example 1 having a smaller surface roughness Ra(b) in the peripheral region than that of the electrolyte sheet of the present invention and the cell using the electrolyte sheet of Comparative Example 2 having a larger surface roughness Ra(b) in the peripheral region than that of the electrolyte sheet of the present invention resulted in 0.1-0.7% of the gas leak rates after 10 heat cycles and 0.9-5.4% after 30 heat cycles, being found sealing of these electrolyte sheets inferior. Although the surface roughness Ra(b) in the peripheral region of the electrolyte sheet of Comparative Example 3 is almost the same as that of the electrolyte sheet of the present invention, the value Ra(i)/Ra(b) of the electrolyte sheet of Comparative Example 3 was greater than 4. A gas leak was observed after 30 heat cycles in this electrolyte sheet. Therefore, it was found that the sealing of the electrolyte sheet of Comparative Example 3 was inferior to that of the electrolyte sheet of the present invention.

(Power Generation Test of the Cell)

Single cell stack devices for testing power generation as shown in FIG. 1 were assembled using the cells produced in the Example 2 and Comparative Example 2 respectively. Then, continuous power generation tests were performed at 750° C., and the I-V curves of the devices were measured. 3%-humidified hydrogen was used as the fuel gas, and air was used as the oxidizing agent. The current was measuring by a device 'R8240' manufactured by Advantest Corporation. The current-voltage was generated by a device 'R6240' manufactured by Advantest Corporation. The maximum output densities ($W/cm^2$) were measured at the start of the power generation test and 200 hours after the start. Results are shown in Table 1. In FIG. 1, numeral 1 is the electrolyte sheet, numeral 2 is the anode, numeral 3 is the cathode, numeral 4 is a single cell, numeral 5 is a fuel gas sealing section, numeral 6 is a metal separator of anode side, numeral 7 is a fuel gas supply pipe, numeral 8 is a fuel gas exhaustion pipe, numeral 9 is air sealing section, numeral 10 is a metal separator of cathode side, numeral 11 is an air supply pipe, and numeral 12 is an air exhaustion pipe.

At the start of the power generation test, the performance of the cell using the electrolyte sheet of Example 2 was larger than that of the cell using the electrolyte sheet of Comparative Example 2 that had a higher surface roughness Ra(b) in the peripheral region than that of the electrolyte sheet of the present invention. Furthermore, 200 hours after starting the test, the performance of the cell using the electrolyte sheet of Example 2 was more than 10% larger than that of the cell using the electrolyte sheet of Comparative Example 2. And, the gas sealing of the cell using the electrolyte sheet of Example 2 was superior to that of the cell using the electrolyte sheet of Comparative Example 2.

Table 1

Examples 3-7 and Comparative Examples 3-7

Roughened electrolyte sheets and cells using these electrolyte sheets were produced using the untreated green sheet obtained in Example 1 by the method same as Example 1 except average Ra(b) and Rz at four arbitrary locations in the peripheral region of the electrolyte sheet obtained as well as the average Ra(i) at nine arbitrary locations in the region other than the peripheral region became the values as shown in Table 2. However, a 2 mm thick stainless steel plate was used as the material of the mold plate for roughening. The hammering tests were performed and the gas leak rates after 10 heat cycles were measured for all the electrolyte sheets obtained by using the method same as Example 1. Results are shown in Table 2.

Table 2

In hammering tests, all the electrolyte sheets of the present invention (electrolyte sheets of Examples 3-7) generated the metallic sounds up to 400° C. Thus, it was determined that cracks were absent in the peripheral regions of these electrolyte sheets after exposed to this temperature. Furthermore, the electrolyte sheets of Examples 5-7 generated metallic sound even at 500° C. Thus, it was determined that cracks were absent in the peripheral regions of these electrolyte sheets after exposed to this temperature. On the other hand, the electrolyte sheets of Comparative Example 6 and 7 that had larger surface roughness Ra(b) in their peripheral regions generated the metallic sounds only at two places at 400° C. and at 300° C., respectively. Thus, it was found that cracks were present in the peripheral regions of these electrolyte sheets after exposed to these temperatures.

In the gas leak test, gas leak rates of all the electrolyte sheets of the present invention (electrolyte sheets of Examples 3-7) were 0% after 10 heat cycles. Thus, these electrolyte sheets had a superior sealability. On the other hand, in the electrolyte sheet of Comparative Example 4, which had Ra(b) and Ra(i) smaller than the range specified in the present invention, the electrolyte sheet of Comparative Example 5, which had Ra(i) smaller than the range specified in the present invention, and the electrolyte sheet of Comparative Example 6, which had Ra(b) smaller than the range specified in the present invention and the Ra ratio is greater than the range specified in the present invention, gas leaks occurred after 10 heat cycles. Thus, these electrolyte sheets had an inferior sealability.

Example 8

A long green tape having a thickness of 55 μm was obtained by the method same as Example 1 except a powder mixture of 99.5 mass parts of commercially available 8 mol % yttrium oxide-stabilized zirconia powder and 0.5 mass parts of commercially available alumina powder was used as a raw material. This green tape was cut into a circular shape having approximately 160 mmϕ. Then, the green sheet was detached from the PET film. Thereby, an untreated green sheet was obtained.

A green sheet, one surface of which was roughened, was obtained by the method same as Example 1 except the surface roughening mold plate used in the Example 1 was placed only on the upper stage of the compression molding machine and the mold plate whose surface was not roughened was placed in the lower stage of the compression molding machine. This greensheet was fired in the condition same as Example 1. Thereby, an 8YSZ thin-film electrolyte sheet having about 120 mmϕ and 42 μm of a thickness was obtained.

The surface roughness of this thin-film electrolyte sheet was measured by the method same as Example 1. The average surface roughness Ra(b) at four arbitrary places in the peripheral region (approximately 5 mm wide from the peripheral end) of the roughened surface of this sheet was 0.14 μm, Rz was 1.6 μm, and Sm was 0.9 μm. The average surface roughness Ra(i) at nine arbitrary locations in the middle region of the electrolyte sheet was 0.4 μm. The surface roughness Ra on the side opposite to the roughened side was 0.15 μm.

The hammering test was performed on the obtained thin-film electrolyte sheet by the method same as Example 1. The thin film electrolyte sheet of this Example resulted in 'Good' up to 400° C. and 'Pass' at 500° C.

An anode paste containing 60 mass parts of nickel oxide powder and 40 mass parts of 8 mol % yttrium oxide-stabilized zirconia powder that were used in Example 1 was coated on the surface opposite to the roughened surface of the thin-film electrolyte sheet. Then, the thin-film electrolyte sheet was fired at 1300° C. Thereby, an anode-supported half-cell containing an 800 μm thick anode layer was obtained.

The gas leak test was performed on the anode-supported half-cell as did in the Example 1. In this test, a melted sealant was coated in the peripheral region of the anode layer to prevent the gas leak from the anode layer. The gas leakage from the cathode side was zero after 10 thermal cycles.

By the hammering test, it was determined that there were no cracks in the peripheral region of the thin-film electrolyte sheet of this Example even at 400° C. Also, by the gas leak test, it was confirmed that the thin-film electrolyte sheet of this Example had a superior gas leak resistance. Therefore, it was found that the electrolyte sheet of the present invention was also suitable for the anode-supported half-cell.

INDUSTRIAL APPLICABILITY

The present invention relates to technologies on an electrolyte sheet for SOFC and a single cell employing the electrolyte sheet. The technologies of the present invention can realize the electrolyte sheet and the cell that have an excellent handling strength and an excellent gas sealability. Therefore, the present invention can contribute to the higher reliability and cost reduction of SOFC.

TABLE 1

|  | Example 1 | Example 2 | Comparative Example 1 | Comparative Example 2 |
|---|---|---|---|---|
| Electrolyte Sheet Peripheral Region |  |  |  |  |
| Ra(b) [μm] | 0.14 | 0.23 | 0.02 | 4.1 |
| Rz [μm] | 1.8 | 2.6 | 0.1 | 9.2 |
| Sm [μm] | 0.7 | 2.4 | 0.007 | 6.9 |
| Region Other than the Peripheral Region |  |  |  |  |
| Ra(i) [μm] | 0.5 | 0.4 | 0.6 | 0.7 |
| Ra Ratio |  |  |  |  |
| Ra(i)/Ra(b) | 3.57 | 1.74 | 30.00 | 0.17 |
| Hammering Test |  |  |  |  |
| RT | Good | Good | Good | Fail |
| 300° C. | Good | Good | Pass | — |
| 400° C. | Good | Good | Pass | — |
| 500° C. | Good | Good | Fail | — |
| Gas Leak Rate [%] After 10 Cycles |  |  |  |  |
| Anode Side | 0.0 | 0.0 | 0.3 | 0.1 |
| Cathode Side | 0.0 | 0.0 | 0.7 | 0.2 |
| After 30 Cycles |  |  |  |  |
| Anode Side | 0.0 | 0.0 | 3.5 | 2.6 |
| Cathode Side | 0.0 | 0.0 | 5.4 | 0.9 |
| Maximum Output |  |  |  |  |

TABLE 1-continued

|  | Example 1 | Example 2 | Comparative Example 1 | Comparative Example 2 |
|---|---|---|---|---|
| Density [W/cm$^2$] |  |  |  |  |
| At Start |  | 0.41 |  | 0.38 |
| After 200 h |  | 0.40 |  | 0.34 |

TABLE 2

|  |  | Example 3 | Example 4 | Example 5 | Example 6 | Example 7 | Comparative Example 3 | Comparative Example 4 | Comparative Example 5 | Comparative Example 6 | Comparative Example 7 |
|---|---|---|---|---|---|---|---|---|---|---|---|
| Electrolyte Sheet |  |  |  |  |  |  |  |  |  |  |  |
| Peripheral Region | Ra(b) [μm] | 0.06 | 0.08 | 0.19 | 0.21 | 0.29 | 0.02 | 0.06 | 0.06 | 0.33 | 0.45 |
|  | Rz [μm] | 0.2 | 0.2 | 1.8 | 1.7 | 2.4 | 0.1 | 0.2 | 0.2 | 2.9 | 4.0 |
| Region Other than the Peripheral Region | Ra(i) [μm] | 0.22 | 0.21 | 0.71 | 0.72 | 0.37 | 0.15 | 0.16 | 0.31 | 1.9 | 1.9 |
| Ra Ratio | Ra(i)/Ra(b) | 3.7 | 2.6 | 3.7 | 3.4 | 1.3 | 7.5 | 2.7 | 5.2 | 5.8 | 4.2 |
| Hammering Test | RT | Good | Good | Good | Good | Good | Good | Good | Good | Good | Good |
|  | 300° C. | Good | Good | Good | Good | Good | Good | Good | Good | Good | Pass |
|  | 400° C. | Good | Good | Good | Good | Good | Good | Pass | Good | Pass | Good |
|  | 500° C. | Pass | Pass | Good | Good | Good | Pass | Good | Pass | Pass | Pass |
| Gas Leak Rate [%] After 10 Cycles |  |  |  |  |  |  |  |  |  |  |  |
| Anode Side |  | 0.0 | 0.0 | 0.0 | 0.0 | 0.0 | 1.1 | 0.1 | 0.1 | 0.0 | 0.0 |
| Cathode Side |  | 0.0 | 0.0 | 0.0 | 0.0 | 0.0 | 0.6 | 0.0 | 0.2 | 0.0 | 0.0 |

The invention claimed is:

1. An electrolyte sheet for solid oxide fuel cell, comprising:
a peripheral region and a region other than the peripheral region at least on one surface of the electrolyte sheet, the peripheral region and the region other than said peripheral region being located on a same side of the electrolyte sheet while the peripheral region being disposed on a periphery of said electrolyte sheet, and if the electrolyte sheet comprises a hole, a region surrounding the hole is included in the peripheral region,
wherein a surface roughness Ra(b) in the peripheral region is different from a surface roughness Ra(i) in the region other than the peripheral region,
wherein the surface roughness Ra(b) in the peripheral region is at least 0.05 μm and less than 0.3 μm,
wherein the surface roughness Ra(i) in the region other than the peripheral region is at least 0.2 μm and at most 0.72 μm,
wherein a ratio (Ra(i)/Ra(b)) of the surface roughness Ra(i) to the surface roughness Ra(b) is more than 1 and at most 4, and
wherein the surface roughness Ra(b) and the surface roughness Ra(i) are arithmetic mean roughness values that are determined by an optical and laser-based non-contact three-dimensional profile measuring device in accordance with a German standard 'DIN-4768'.

2. The electrolyte sheet of claim 1, wherein the surface roughness Ra(i) is at least 0.3 μm and at most 0.72 μm.

3. The electrolyte sheet of claim 1, wherein a surface roughness Rz in the peripheral region is at least 0.1 μm and at most 3.0 μm;
where the surface roughness Rz is a mean roughness depth of roughness that is determined by the optical and laser-based non-contact three-dimensional profile measuring device in accordance with the German standard 'DIN-4768'.

4. The electrolyte sheet of claim 1, wherein an average peak spacing Sm in the peripheral region is at least 0.01 μm and at most 3.0 μm;
where the average peak spacing Sm is a mean width of profile element that is determined by the optical and laser-based non-contact three-dimensional profile measuring device in accordance with a German standard 'DIN-4287'.

5. The electrolyte sheet of claim 1, comprised of a dense sintered body having a thickness of at least 50 μm and at most 400 μm and having a plane area of at least 50 cm$^2$ and at most 900 cm$^2$.

6. The electrolyte sheet of claim 1, wherein the peripheral region of the electrolyte sheet is constituted with a band having at most 8 mm of a width from a peripheral end of the electrolyte sheet; and
wherein the other region is located at a more interior place than the peripheral region.

7. The electrolyte sheet of claim 1, containing at least one oxide selected from the group consisting of zirconia-based oxide, LaGaO$_3$-based oxide and ceria-based oxide.

8. The electrolyte sheet of claim 7, wherein the zirconia-based oxide is zirconia stabilized by at least one element selected from the group consisting of scandium, yttrium, cerium and ytterbium.

9. A single cell for solid oxide fuel cell, comprising an anode, a cathode and the electrolyte sheet of claim 1 provided between the anode and the cathode;
wherein the anode and the cathode are placed in the region other than the peripheral region of the electrolyte sheet.

10. A solid oxide fuel cell, comprising a plurality of cells stacked on one another, at least one of the cells being the cell of claim 9.

11. A method of producing an electrolyte sheet for solid oxide fuel cell of claim 1, the method comprising a step of:
pressing at least one surface of a greensheet with a mold plate having a roughened surface;
wherein a surface roughness Ra(b) in a peripheral region of the roughened surface of the mold plate is at least 0.05 μm and at most 0.3 μm,
wherein a surface roughness Ra(i) in a region other than the peripheral region of the roughened surface of the mold plate is at least 0.2 μm and at most 10 μm, wherein the surface roughness Ra(b) of the mold plate is smaller than the surface roughness Ra(i) of the mold plate, and wherein both of said surface roughness Ra(b) and surface roughness Ra(i) of the mold plate are arithmetic mean roughness values that are determined by an optical and laser-based non-contact three-dimensional profile measuring device in accordance with a German standard 'DIN-4768'.

12. The method of claim 11, wherein the mold plate is mounted in a compression molding machine via a cushion.

13. The method of claim 11, wherein the mold plate comprises an aperture for air vent.

14. The method of claim 11, further comprising a step of firing the at least one surface of the greensheet, after performing the pressing step, to obtain the electrolyte sheet so that a surface roughness Ra(b) of the electrolyte sheet obtained becomes at least 70% and at most 90% of a surface roughness Ra(b) of the greensheet roughened.

15. The method of claim 11, wherein the peripheral region of the roughened surface of the mold plate is constituted with a band having at most 8 mm of a width from a peripheral end of said roughened surface; and wherein the other region of the roughened surface of the mold plate is located at a more interior place than the peripheral region.

* * * * *